United States Patent [19]

Khanmamedov

[11] Patent Number: 5,718,872
[45] Date of Patent: Feb. 17, 1998

[54] APPARATUS FOR CONTROLLING THE HYDROGEN SULFIDE CONCENTRATION IN THE ACID GAS FEEDSTOCK OF A SULFUR RECOVERY UNIT

[76] Inventor: Tofik K. Khanmamedov, 2321 N. Court, Garland, Tex. 75044

[21] Appl. No.: 668,404

[22] Filed: Jun. 21, 1996

Related U.S. Application Data

[62] Division of Ser. No. 319,746, Oct. 7, 1994, Pat. No. 5,556,606.

[51] Int. Cl.$^6$ .................................................. B01D 50/00
[52] U.S. Cl. .......................... 422/168; 422/169; 422/171; 422/178; 423/228; 423/242.2; 423/243.01; 95/136; 96/143; 96/144
[58] Field of Search ........................ 422/169–171, 422/173, 177, 178, 168; 423/228, 229, 576.2, 563, 573.1, 574.1, 242.2, 243.01, 95; 95/174, 136, 181; 96/143, 144

[56] References Cited

U.S. PATENT DOCUMENTS

| | | | |
|---|---|---|---|
| 4,372,925 | 2/1983 | Cornelisse | 423/228 |
| 4,412,977 | 11/1983 | Fiseh | 423/228 |
| 4,741,884 | 5/1988 | Carter et al. | 422/170 |
| 4,889,700 | 12/1989 | Elgue et al. | 423/228 |
| 4,997,630 | 3/1991 | Wagner et al. | 423/228 |

*Primary Examiner*—Hien Tran
*Attorney, Agent, or Firm*—H. Dennis Kelly; Jeffrey T. Hubbard; Timmons & Kelly

[57] ABSTRACT

An apparatus for controlling the hydrogen sulfide concentration in an acid gas stream and the hydraulic loading of a sulfur recovery unit of the type having an absorber for contacting a sour gas stream with an absorbent, a regenerator for regenerating the absorbent to form an acid gas stream and a recycle system. Embodiments using multiple absorbers and/or multiple regenerators are disclosed.

10 Claims, 2 Drawing Sheets

APPARATUS FOR CONTROLLING THE HYDROGEN SULFIDE CONCENTRATION IN THE ACID GAS FEEDSTOCK OF A SULFUR RECOVERY UNIT

This is a division of application Ser. No. 08/319,746, filed Oct. 7, 1994, now U.S. Pat. No. 5,556,606.

This invention relates to the control of the hydrogen sulfide concentration in the acid gas feedstock of a sulfur recovery unit. More particularly, the invention relates to the configuration of an amine absorption system for the removal of hydrogen sulfide from feedstocks such as sour natural gas or sour gas streams generated in refinery or gas liquidation operations. The invention also relates to controlling the composition and volume of an acid gas stream and thereby the hydraulic loading of a sulfur recovery unit.

BACKGROUND OF THE INVENTION

Many currently existing sources of hydrocarbon fuels such as natural gas, crude oil, and coal for liquidation contain significant amounts of sulfur. Due to environmental and other concerns, the sulfur present in many of these hydrocarbon fuels must be removed before the fuels can be utilized. For example, in refinery operations, sulfur is typically extracted from crude oil in the form of hydrogen sulfide mixed with carbon dioxide, ammonia and other gases.

Extraction of hydrogen sulfide from a sour gas stream may be accomplished by means of any suitable adsorbent or absorbent. Preferably, where the sour gas feed stream contains a high fraction of non-reactive gases, an absorption solvent that is selective for hydrogen sulfide in the presence of the non-reactive gas fraction is used. More specifically, extraction of hydrogen sulfide from the sour gas stream includes the use of an absorption solvent which is highly selectively for hydrogen sulfide in the presence of carbon dioxide which tends to readily absorb along with hydrogen sulfide. Suitable absorption solvents include aqueous solutions of organic or inorganic alkaline compounds which selectively absorb the hydrogen sulfide in a heat reversible relationship. Organic hydrogen sulfide absorbents which may be employed in formulating the solvent solution include organic amines. Such compounds may take the form of substituted or unsubstituted aliphatic, cycloalkyl, aryl or heteraryl amines. Certain basic amino acids and amides will absorb hydrogen sulfide and may also be employed. Suitable organic compounds thus include dimethyl formamide, morpholine, and various amino alcohols and particularly the alkanolamines, including the mono- or poly-alkanolamines. Thus, examples of suitable absorbents include aqueous solutions of monoethanolamine, diethanolamine, triethanolamine, alkylalkanolamines such as methyldiethanolamine and ethylaminoethanol, diisopropanolamine, di-n-propanolamine, n-propanolamine, isopropanolamine, cyclohexylaminoethanol, and 2-amino-2-methyl-1-propanol. The tertiary amines exhibit a greater tendency for preferential absorption of hydrogen sulfide in the presence of carbon dioxide than do the primary amines and to a lesser extent the secondary amines. Suitable tertiary amines include methyldiethanolamine, triethanolamine and methyldiethanolamine. Preferably, the alkaline absorbent for hydrogen sulfide is present in the aqueous solution in an amount within the range of 20–60 percent. Such amines may be employed in aqueous solution with an organic or inorganic acid. For example, the absorbing solvent may take the form of tertiary amines such as methyldiethanolamine or triethanolamine in an aqueous solution containing a minor amount of an acid such as phosphoric acid.

Hydrogen sulfide and other components extracted from the sour gas stream with an absorbent are stripped from the absorbent by direct or indirect heating in a suitable vessel (regenerator) such as a packed or tray type column to produce an acid gas containing gaseous hydrogen sulfide which is then conveyed to a sulfur recovery unit ("SRU"). While the use of an absorbent solvent which is selective for hydrogen sulfide in the presence of the other components of the sour gas stream tends to increase the concentration of hydrogen sulfide in the acid gas, in many instances the acid gas will also contain significant amounts of carbon dioxide. In some cases, the concentration of carbon dioxide in the acid gas will be several time greater than the concentration of hydrogen sulfide. The acid gas stream containing hydrogen sulfide is subsequently routed to one or more sulfur recovery units and the absorbent is recycled to the absorber unit.

In the sulfur recovery unit the hydrogen sulfide is converted to elemental sulfur via the Claus process, which takes advantage of the reactivity of sulfur dioxide and hydrogen sulfide to produce elemental sulfur by bringing these two agents together in approximately stoichiometric proportions of two parts hydrogen sulfide to one part sulfur dioxide. Recovery of elemental sulfur from sulfur containing gas streams by the Claus process is a widely practiced procedure wherein elemental sulfur is produced by the well known Claus reaction as follows:

$$2H_2S + SO_2 \longleftrightarrow 2H_2O + 3S$$

Under normal circumstances, the feed gas (acid gas) to the Claus process contains a substantial portion of hydrogen sulfide which is partially oxidized by combustion to produce sulfur dioxide in an amount approximately satisfying the stoichiometric relationship indicated above. Sufficient oxygen is supplied to the hydrogen sulfide containing stream in a combustion zone to oxidize about ⅓ of the hydrogen sulfide to sulfur dioxide via the following reaction: $2H_2S + 3O_2 \longrightarrow 2H_2O + 2SO_2$. The hydrogen sulfide and sulfur dioxide react to generate water and elemental sulfur. Additionally, hydrocarbons contained in the acid gas stream are converted to organic sulfur compounds such as carbon disulfide or others, depending upon the hydrocarbon concentration.

Alternatively, approximately ⅓ or more of the acid gas stream is diverted to a combustion zone where oxidation of the hydrogen sulfide is carried out in the presence of an amount of oxygen adequate to provide the required amount of sulfur dioxide. The remaining portion of the acid gas stream is not treated so that when the split portions of the gas stream are recombined, the combined gas stream contains hydrogen sulfide and sulfur dioxide in the approximately stoichiometric ratio.

As indicated above, three moles of oxygen are required to combust two moles of hydrogen sulfide to water and sulfur dioxide. The sulfur dioxide then reacts with the remaining hydrogen sulfide in one or more reactor(s) or reaction zone(s) over a catalyst such as bauxite, alumina or titanium dioxide at elevated temperatures to produce elemental sulfur and water vapor. The organic sulfur compounds are also oxidized in the reactor to hydrogen sulfide and carbon dioxide. Additionally, during combustion of the hydrogen sulfide, a portion of the hydrogen sulfide in the feed gas dissociates to free hydrogen and elemental sulfur, $H_2S$ + heat $\longrightarrow H_2 + S$ via thermal decomposition. The residual hydrocarbons present in the gas stream are oxidized to form carbon monoxide and water vapor.

Oxygen is normally supplied to a Claus unit as pressurized combustion air which typically contains about 21 mole % oxygen and 79 mole % nitrogen on a dry basis. Thus, for every mole of oxygen used to combust hydrogen sulfide, approximately 4 moles of nitrogen are introduced into the gas stream. Although nitrogen is inert under typical Claus reaction conditions, the nitrogen contained in the combustion air represents a significant portion of the hydraulic loading of a Claus type sulfur recovery unit.

Additionally, the acid gas stream may also contain other gases, such as carbon dioxide which are inert under typical Claus reaction conditions. Some sour gases contain substantial amounts of carbon dioxide which is readily absorbed in the medium used to scrub hydrogen sulfide from the sour gas. Carbon dioxide absorbed by the absorbent or scrubbing medium is thermally separated, along with hydrogen sulfide, when the absorbent is regenerated and contributes to volume of acid gas generated and to the hydraulic loading on the sulfur recovery unit. Depending upon the relative concentrations of carbon dioxide and hydrogen sulfide in the sour gas, the acid gas generated by stripping the absorbent may contain several times the amount of carbon dioxide as hydrogen sulfide. Consequently, carbon dioxide in the acid gas stream can have a significant impact on the hydraulic loading of the sulfur recovery unit. The thermodynamics of the Claus reaction render the recovery of elemental sulfur very sensitive to the concentration of hydrogen sulfide in the acid gas stream. The sulfur recovery increases directly with the hydrogen sulfide concentration. Higher hydrogen sulfide concentration in the acid gas stream also promotes greater flame stability of the burner in a sulfur recovery unit.

The amount of oxygen supplied to a Claus type sulfur recovery unit must be controlled to compensate for variability in the volume and composition of the acid gas feed stream(s) to the unit in order to maintain the desired stoichiometric ratio of two moles of hydrogen sulfide per mole of sulfur dioxide in the gas stream entering the reaction zone. The total gas flow through a sulfur recovery unit is, however, limited by the hydraulic capacity of the system. Thus, carbon dioxide contained in the acid gas stream along with nitrogen contained in the combustion air tend to limit the effective capacity of a sulfur recovery unit. Moreover, from a design standpoint it is not necessarily desirable to design a sulfur recovery unit capable of combusting, with air, the peak volume of acid gas that must be processed due to increased equipment cost and capital expenditure. Additionally, in the case of existing plants, the hydraulic limitations of a sulfur recovery unit may be exceeded if acid gas production is increased due to changes in the process or feedstock. Thus, there exists a need for a method and apparatus for controlling the hydraulic loading on a Claus type sulfur recovery unit.

Taggart et al., U.S. Pat. No. 4,919,912, discloses a process for treating sulfur containing gas streams using the Claus reaction in which a recycled stream containing a reactive component is employed in a negative feedback mode to maintain the sulfur producing Claus reaction at approximately equilibrium conditions. The feedstream may contain hydrogen sulfide or sulfur dioxide in a minor amount in an inert gas background. The feedstream to the reaction zone contains a stoichiometrically excess amount of sulfur dioxide for the Claus reaction. Effluent from the reaction zone is passed to a hydrogenation zone where the sulfur dioxide is converted to hydrogen sulfide. Hydrogen sulfide is extracted from the hydrogenation zone effluent and recycled to the Claus reaction zone.

Bond et al., U.S. Pat. No. 3,963,443, discloses a gas mixer and reactor and processes utilizing the mixer and, in particular, a process for converting sulfur containing gas into elemental sulfur.

Bond et al., U.S. Pat. No. 4,051,231, discloses a gas mixer and reactor which includes an elongated gas flow chamber with a nozzle arrangement at its inlet. Atmospheres for kilns having controlled amounts of free hydrogen, carbon monoxide or oxygen, for example, are produced by burning controlled ratios of fuel, air, and in some cases an inert gas mixed by the reactor.

Bond et al., U.S. Pat. No. 4,069,020, discloses a process for the production of reducing gases and an apparatus for use therein. A unique gas mixer and reactor is provided which can be used to effect substoichiometric reactions of gaseous reactants to produce a hydrogen-rich gas. The gases which are to be reduced are then admixed with the hydrogen-rich gas, and the gaseous mixture is passed to a catalytic reactor where the reduction reaction takes place.

Bond, et al., U.S. Pat. No. 4,123,220, discloses a gas mixer and reactor which is especially suitable as a burner.

The foregoing references, the disclosures of which are incorporated herein by reference for all purposes, do not, however, address the need for controlling the hydraulic loading or the concentration of hydrogen sulfide in the acid gas feedstock of a Claus type sulfur recovery unit.

SUMMARY OF THE INVENTION

The present invention provides an apparatus and method for controlling the hydraulic loading on a Claus type sulfur recovery unit including a method and apparatus for increasing the concentration of hydrogen sulfide in the acid gas stream to the unit. The invention encompasses several embodiments utilizing various arrangements of absorbers and strippers that can be varied based on the feedstock volume and composition concentration of residual hydrogen sulfide permitted in the sweetened gas stream and other design criteria.

DETAILED DESCRIPTION

Figure 1:
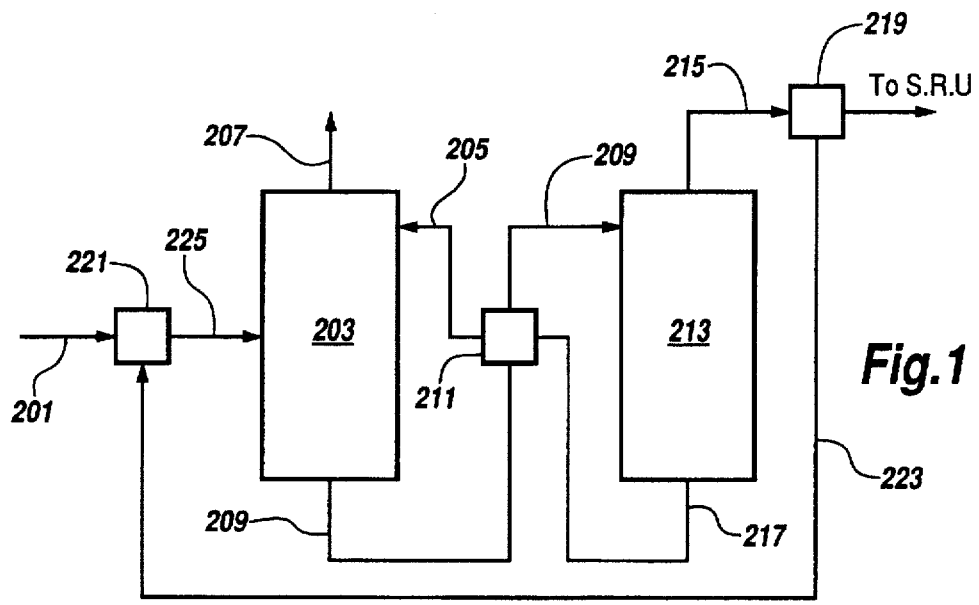
FIG. 1 is a schematic illustration of an embodiment of the present invention employing a single scrubber recycle system.

Referring now to FIG. 1, an embodiment of the present invention is schematically illustrated. A sour gas feed stream is directed via primary feed gas line 201 to absorber 203. Hydrogen sulfide is extracted from the sour gas in absorber 203 by scrubbing with a hydrogen sulfide selective absorbent solution fed to the scrubber via scrubbing solution line 205. Absorber 203 may be of any Conventional contactor design such as an open spray tower, a packed column or multistage tray-type scrubber. Sweetened gas exits the absorber 203 through exit line 207. Hydrogen sulfide rich absorbent solution is withdrawn from the base of absorber 203 through line 209, passed through heat exchanger 211 and fed to stripper 213 where gases dissolved in the scrubbing solution are stripped from the solution by heating. Concentrated acid gas exits the top of stripper 213 through line 215 and regenerated absorbent solution exits the stripper 213 through line 217, passes through heat exchanger 211 and is cycled to the top of absorber 203.

In conventional practice, the concentrated acid gas stream leaving the top of the stripper 213 is routed directly to a sulfur recovery unit. However, in many applications the concentrated acid gas stream leaving the stripper contains substantial amounts of carbon dioxide, hydrocarbons and water vapor which are readily absorbed in the scrubbing solution in addition to hydrogen sulfide. The composition of a typical sour gas feed stream and of the acid gas stream generated from it by conventional amine scrubbing are set forth in Table 1 below.

As indicated above, the molar ratio of carbon dioxide to hydrogen sulfide in the sour gas feed stream is 6.0 and the ratio of carbon dioxide to hydrogen sulfide in the concentrated acid gas from the stripper is 2.79. Due to the high loading of carbon dioxide in acid gas streams similar to the one described above, the lines, vessels and equipment associated with the sulfur recovery unit must be sized to accommodate the hydraulic loading of not only the hydrogen sulfide but also the carbon dioxide contained in the concentrated acid gas stream. Sizing the sulfur recovery unit to accommodate the additional hydraulic loading caused by the carbon dioxide in the concentrated acid gas stream requires additional capital and operating expense. Additionally, the partial combustion process employed in a Claus-type sulfur recovery unit is difficult to maintain where the hydrogen sulfide in the feed stream to the unit is diluted with large volumes of incombustible gases.

In one embodiment of the present invention these problems are addressed by increasing the concentration of hydrogen sulfide in the acid gas stream by shifting the equilibrium conditions under which the hydrogen sulfide is absorbed by the scrubbing solution. As illustrated in FIG. 1, the concentrated acid gas stream from stripper 213 is directed to splitting means 219 and physically separated into two streams, one of which is recycled to mixer 221 via line 223. The recycled acid gas is mixed with the sour gas feed stream in the mixer 221 from which the mixed gas stream enters the absorber 203 through line 225. Increasing the concentration of hydrogen sulfide in the sour gas feed to the absorber 203 shifts the equilibrium conditions to favor absorption of hydrogen sulfide over carbon dioxide by the hydrogen sulfide selective absorption medium. Consequently, more hydrogen sulfide and less carbon dioxide is absorbed and subsequently stripped from the scrubbing solution. Additionally, the concentrations of combustible components of the sour gas feed stream, such as hydrocarbons and water vapor are decreased in the resulting acid gas Referring to Table 1, the calculated equilibrium concentrations of the various gas streams described above are set forth.

TABLE 1

| Streams | Feed Gas, mol/h 201 | Acid Gas, mol/h 215 | Concentration, mol % 215 | Sweet Gas, mol/h 207 | Concentration, mol % 207 | Recycle, mol/h 223 | $CO_2/H_2S$ Ratio 201 | $CO_2/H_2S$ Ratio 225 |
|---|---|---|---|---|---|---|---|---|
| Conventional | | | | | | | | |
| $H_2S$ | 5.50 | 5.471 | 24.50 | 0.0260 | 23 ppm | — | | |
| $CO_2$ | 33.00 | 15.262 | 68.362 | 17.738 | 1.61 | — | | |
| $H_2O$ | 13.585 | 1.427 | 6.390 | 24.222 | 2.20 | — | 6.0 | — |
| $CH_4$ | 990.00 | 0.152 | 0.683 | 989.839 | 89.72 | — | | |
| $C_2H_6$ | 55.00 | 0.0111 | 0.052 | 54.989 | 4.98 | — | | |
| $C_3H_8$ | 11.00 | 0.0014 | 0.006 | 10.999 | 0.9977 | — | | |
| $C_4H_{10}$ | 5.50 | 0.0017 | 0.007 | 5.498 | 0.49 | — | | |
| New | | | | | | | | |
| $H_2S$ | 5.50 | 5.551 | 37.80 | 0.0457 | 40 ppm | 8.266 | | |
| $CO_2$ | 33.00 | 8.077 | 55.40 | 24.927 | 2.244 | 12.116 | | |
| $H_2O$ | 13.585 | 0.932 | 6.39 | 25.050 | 2.254 | 1.397 | 6.0 | 3.26 |
| $CH_4$ | 990.00 | 0.058 | 0.376 | 989.934 | 89.066 | 0.0876 | | |
| $C_2H_6$ | 55.00 | 0.0040 | 0.027 | 54.996 | 4.948 | 0.0060 | | |
| $C_3H_8$ | 11.00 | 0.0005 | 0.003 | 10.999 | 0.989 | 0.0007 | | |
| $C_4H_{10}$ | 5.50 | 0.0007 | 0.004 | 5.499 | 0.495 | 0.0010 | | |

As can be observed from Table 1 below, the calculated carbon dioxide/hydrogen sulfide mole ratio in the feed stream to the absorber has been reduced from 6.0 to 3.26 and the calculated carbon dioxide/hydrogen sulfide mole ratio in the concentrated acid gas stream from the stripper has been reduced from 2.79 (Table 1) to 1.47. More significantly, the total calculated volume of acid gas generated has been reduced significantly without substantially impacting the quality of the sweetened gas in terms of hydrogen sulfide concentration. Reducing the volume of the acid gas stream in turn reduces the hydraulic loading on the sulfur recovery unit receiving the acid gas stream, allowing for the design of smaller, more economical, efficient units with higher sulfur recovery.

Figure 2:
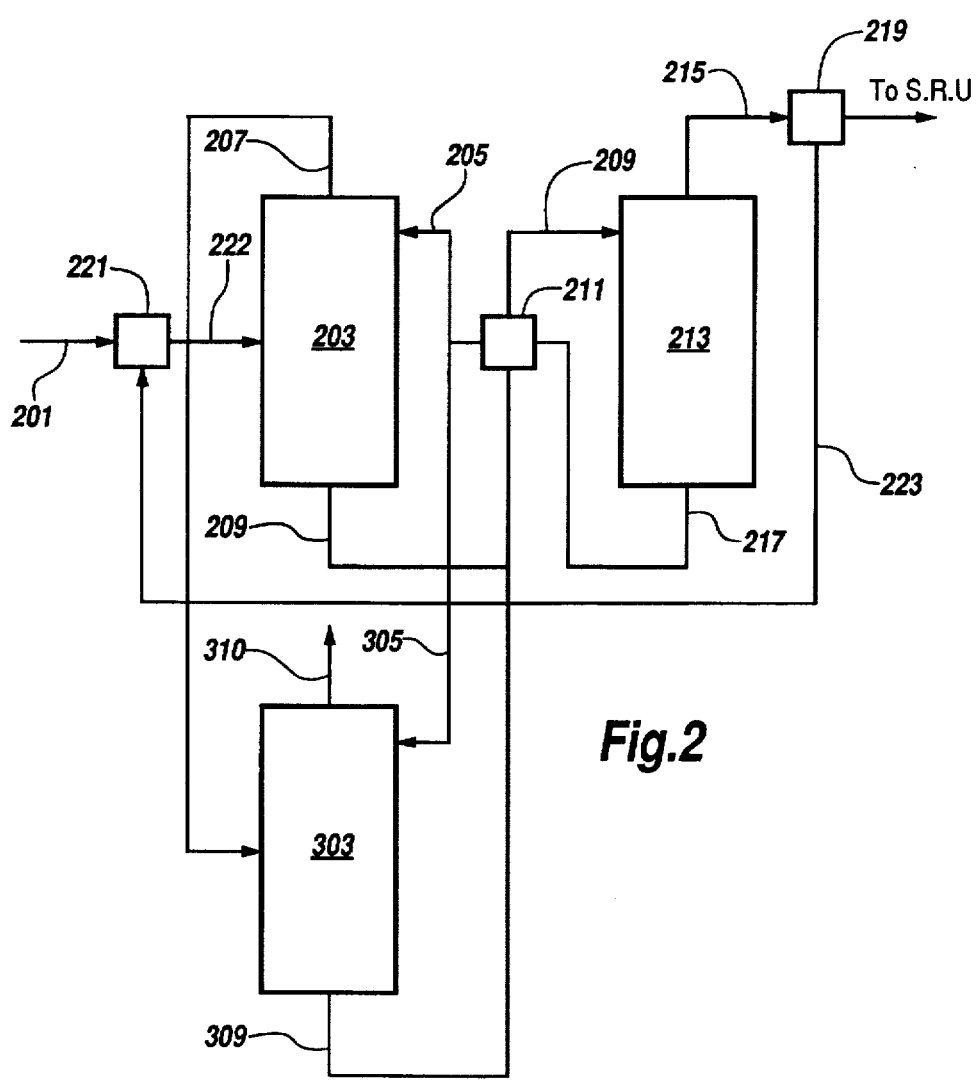
FIG. 2 is a schematic illustration of an alternate embodiment of the present invention employing a multiple scrubber recycle-system.

Referring now to FIG. 2, an alternate embodiment of the present invention employing multiple absorber is schematically illustrated. A sour gas feed stream is directed via primary feed gas line 201 to primary absorber 203. Hydrogen sulfide is extracted from the sour gas in the primary absorber 203 by scrubbing with a hydrogen sulfide selective absorbent solution fed to the primary absorber via scrubbing solution line 205. The partially sweetened gas exits the primary absorber through exit line 207 and feeds into the secondary absorber 303. The gas is treated in the manner described above with a hydrogen sulfide selective absorbent solution fed to the secondary absorber via scrubbing solution line 305. The sweetened gas exits the secondary absorber through exit line 310. The primary and secondary absorbers may be of any conventional contactor design such as an open spray tower, a packed column or multistage tray-type scrubber.

The hydrogen sulfide rich absorbent solution is withdrawn from the bases of both absorbers 203 and 303 through exit lines 209 and 309 respectively. The output streams from the absorbers are subsequently directed to line 209, passed through heat exchanger 211 and fed to stripper 213 through line 209. After treatment, the concentrated acid gas exits stripper 213 through line 215 and regenerated absorbent Moreover, the concentration of the hydrocarbons in the acid gas is much lower than in the case of sour gas treated by conventional methods.

TABLE 2

| Streams | Feed Gas, mol/h 201 | Acid Gas, mol/h 215 | Concentration, mol % 215 | Primary Sweet Gas, mol/h 207 | Concentration, mol % 207 | Second Sweet.Gas mol/h 310 | Concentration, mol/h 310 | Recycle, mol/h 223 | $CO_2/H_2S$ Ratio 201 | 225 |
|---|---|---|---|---|---|---|---|---|---|---|
| Conventional | | | | | | | | | | |
| $H_2S$ | 36.175 | 36.170 | 34.61 | 0.0046 | 4 ppm | — | — | — | | |
| $CO_2$ | 62.806 | 60.545 | 57.93 | 2.262 | 0.22 | — | — | — | | |
| $H_2O$ | 0.000 | 6.677 | 6.39 | 2.884 | 0.28 | — | — | — | | |
| $CH_4$ | 922.233 | 1.026 | 0.98 | 921.206 | 91.65 | — | — | — | 1.736 | — |
| $C_2H_6$ | 59.367 | 0.073 | 0.070 | 59.293 | 5.89 | — | — | — | | |
| $C_3H_8$ | 16.201 | 0.013 | 0.013 | 16.187 | 1.64 | — | — | — | | |
| $C_4H_{10}$ | 2.885 | 0.008 | 0.0069 | 2.877 | 0.2848 | — | — | — | | |
| $C_5H_{12}$ | 0.333 | 0.0008 | 0.0001 | 0.332 | 0.0348 | — | — | — | | |
| New | | | | | | | | | | |
| $H_2S$ | 36.175 | 36.170 | 47.37 | 14.988 | 1.37 | 0.0115 | 11 ppm | 54.25 | | |
| $CO_2$ | 62.806 | 34.516 | 45.215 | 70.441 | 6.44 | 27.758 | 2.69 | 51.78 | | |
| $H_2O$ | 0.000 | 4.878 | 6.38 | 7.156 | 0.65 | 3.268 | 0.32 | 7.32 | | |
| $CH_4$ | 922.233 | 0.729 | 0.952 | 922.459 | 84.33 | 921.508 | 89.35 | 1.10 | 1.736 | 1.26 |
| $C_2H_6$ | 59.367 | 0.046 | 0.060 | 59.384 | 5.44 | 59.321 | 5.75 | 0.069 | | |
| $C_3H_8$ | 16.201 | 0.009 | 0.012 | 16.204 | 1.48 | 16.192 | 1.57 | 0.013 | | |
| $C_4H_{10}$ | 2.885 | 0.0073 | 0.010 | 2.886 | 0.26 | 2.878 | 0.286 | 0.011 | | |
| $C_5H_{12}$ | 0.333 | 0.0007 | 0.001 | 0.333 | 0.030 | 0.332 | 0.033 | 0.0011 | | | solution exits stripper 213, is cycled through heat exchanger 211 and returned to absorbers 203 and 303. As in the previous embodiment, the concentrated acid gas stream from the stripper 213 is directed to splitting means, 219 for physically dividing the stream into two streams, and a portion of the acid gas is recycled to mixer 221 via line 223.

Increasing the concentration of hydrogen sulfide in the sour gas feed to the absorbers 203 and 303 shifts the equilibrium conditions to favor absorption of hydrogen sulfide over carbon dioxide. The addition of a second absorber unit 303 increases the concentration of hydrogen sulfide gas in the concentrated acid gas stream resulting in a decrease in the concentration of hydrogen sulfide in the sweetened gas and permitting the use of a smaller sulfur recovery unit. The sweetened gas is able to meet more stringent specifications with respect to hydrogen sulfide concentration than in the case of the first embodiment. In addition, the absorbers in series allow more flexibility in the quality of the sweetened gas and in the throughput volume of the amine sweetening unit, even when the carbon dioxide and hydrogen sulfide concentrations of the feedstock gas are very high. Referring to TABLE 2, below, it can be seen that the calculated carbon dioxide/hydrogen sulfide mole ratio in the feed stream to the absorber has been reduced from 1.736 to 1.26 by the recycling step and the calculated carbon dioxide/hydrogen sulfide mole ratio has been reduced from 1.736 in the sour gas stream to 0.954 in the concentrated acid gas stream that is to be recycled to the absorber. This reduction takes place despite the very high concentration of carbon dioxide in the sour feed gas. The total volume of concentrated acid gas generated has also been reduced, allowing for a smaller, more economical, and more efficient sulfur recovery unit. Note that the calculated concentration of hydrogen sulfide in the sweet gas stream is quite low (11 ppm) despite the fact that the feed stream contains very high concentrations of both hydrogen sulfide and carbon dioxide.

Figure 3:
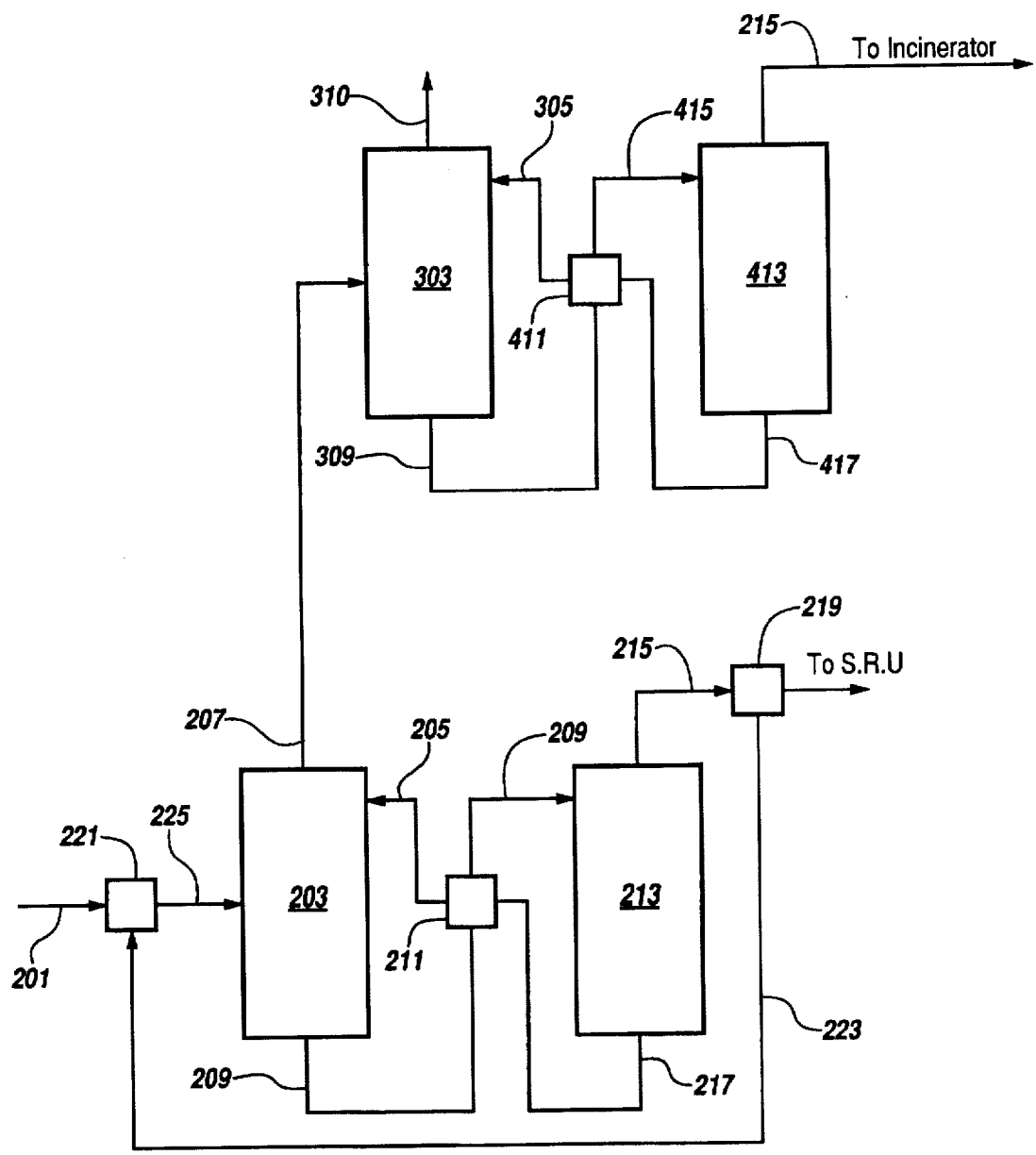
FIG. 3 is a schematic illustration of an alternate embodiment of the present invention employing a multiple scrubber and multiple stripper recycle system.

Another embodiment of the invention can be seen in FIG. 3 which schematically illustrates the use of multiple strippers in addition to multiple absorbers. The sour gas feed stream is directed via the primary feed gas line 201 to the primary absorber 203. The hydrogen sulfide is extracted from the sour gas by the absorbent solution as in the previous embodiments. The hydrogen sulfide rich absorbent solution is withdrawn from the bottom of the primary absorber 203 through line 209, passed through heat exchanger 211 and fed to the primary stripper 213 through line 209. The regenerated absorbent solution and a portion of the acid gas stream are recycled as discussed in the previous embodiment. A portion of the concentrated acid gas stream is routed to the sulfur recovery unit, as in the previous embodiments. In this embodiment, however the partially sweetened gas stream is fed through line 207 into a secondary absorber 303 where it is treated again with a hydrogen sulfide selective absorbent. The sweetened gas exits through line 310 while the hydrogen sulfide rich absorbent solution is withdrawn through line 309, passed through heat exchanger 411, into line 415 and into the secondary stripper 413. The secondary stripper 413 regenerates the absorbent solution which is recycled to the secondary absorber 303 through line 417 into the heat exchanger 411 and back into the secondary absorber through line 305. The acid gas stream from the secondary stripper 413 may be sent to an incineration unit.

The advantages of the multiple absorbers/multiple strippers system can be seen by referring to TABLE 3. When using this equipment configuration the calculated carbon dioxide to hydrogen sulfide ratio in the absorber feed gas is reduced from the 1.736 to 1.23, even though the assumed concentrations of hydrogen sulfide and carbon dioxide in the feed gas are very high. The calculated concentration of hydrogen sulfide in the sweetened gas finished product is a very low 0.023 ppm; capable of meeting the most exacting pipeline specifications.

TABLE 3

| Streams | Feed Gas, mol/h 201 | Acid Gas, mol/h 215 | Concentration, mol % 215 | Primary Sweet Gas, mol/h 207 | Concentration, mol % 207 | Second Sweet Gas mol/h 310 | Concentration, mol/h 310 | Recycle, mol/h 223 | $CO_2/H_2S$ Ratio 201 | 225 |
|---|---|---|---|---|---|---|---|---|---|---|
| Conventional | | | | | | | | | | |
| $H_2S$ | 36.175 | 36.170 | 34.61 | 0.0046 | 4 ppm | — | — | — | | |
| $CO_2$ | 62.806 | 60.545 | 57.93 | 2.262 | 0.22 | — | — | — | | |
| $H_2O$ | 0.000 | 6.677 | 6.39 | 2.884 | 0.28 | — | — | — | | |
| $CH_4$ | 922.233 | 1.026 | 0.98 | 921.206 | 91.65 | — | — | — | 1.736 | — |
| $C_2H_6$ | 59.367 | 0.073 | 0.070 | 59.293 | 5.89 | — | — | — | | |
| $C_3H_8$ | 16.201 | 0.013 | 0.013 | 16.187 | 1.64 | — | — | — | | |
| $C_4H_{10}$ | 2.885 | 0.008 | 0.0069 | 2.877 | 0.2848 | — | — | — | | |
| $C_5H_{12}$ | 0.333 | 0.0008 | 0.0001 | 0.332 | 0.0348 | — | — | — | | |
| New | | | | | | | | | | |
| $H_2S$ | 36.175 | 35.969 | 49.15 | 0.0147 | 14 ppm | 0.000023 | 0.023 ppm | 53.954 | | |
| $CO_2$ | 62.806 | 32.081 | 43.84 | 30.913 | 2.98 | 15.057 | 1.48 | 48.122 | | |
| $H_2O$ | 0.000 | 4.674 | 6.403 | 3.229 | 0.31 | 2.953 | 0.29 | 70.11 | | |
| $CH_4$ | 922.233 | 0.416 | 0.56 | 921.816 | 89.11 | 920.809 | 90.5 | 0.624 | 1.736 | 1.23 |
| $C_2H_6$ | 59.367 | 0.02366 | 0.032 | 59.343 | 5.73 | 59.263 | 5.83 | 0.0355 | | |
| $C_3H_8$ | 16.201 | 0.00493 | 0.0067 | 16.196 | 1.56 | 16.182 | 1.59 | 0.0074 | | |
| $C_4H_{10}$ | 2.885 | 0.00559 | 0.0076 | 2.879 | 0.2776 | 2.872 | 0.28 | 0.0084 | | |
| $C_5H_{12}$ | 0.333 | 0.00056 | 0.0007 | 0.332 | 0.031 | 0.031 | 0.03 | 0.0008 | | |

It will be understood and appreciated by those skilled in the art that the discrete devices disclosed in the drawings may be functional elements of common devices or of a microprocessor or other computer based control system, all of which are within the scope of the present invention.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

I claim:

1. Apparatus for processing a sour gas feed stream having hydrogen sulfide and at least one unselected component, prior to sending the stream to a sulfur recovery unit, the apparatus comprising:

an absorber for contacting the sour gas feed stream with an absorbent having greater selectivity for hydrogen sulfide than the at least one unselected component, discharging a sweetened gas stream and a hydrogen sulfide rich absorbent solution;

means for introducing the sour gas feed stream into the absorber;

regenerating means, receiving the hydrogen sulfide rich absorbent solution from the absorber, for regenerating the hydrogen sulfide rich absorbent solution, discharging a hydrogen sulfide rich concentrated acid gas stream that is at least partially employed as a recycle stream, and discharging a regenerated absorbent solution that is employed as the absorbent in the absorber;

recycling means, connected to the regenerating means, for recycling the recycle stream to the means for introducing the sour gas feed stream into the absorber; and splitting means, connected between the regenerating means and the recycling means, for physically dividing the concentrated acid gas stream into the recycle stream and a portion that is sent to the sulfur recovery unit.

2. The apparatus of claim 1 further comprising a means for mixing the recycle stream with the sour gas stream fed to the absorber.

3. The apparatus of claim 1 further comprising a means for heat exchange, connected between the absorber and the regenerating means, for heating the hydrogen sulfide rich absorbent solution.

4. Apparatus for processing a sour gas feed stream prior to sending the stream to a sulfur recovery unit, the sour gas feed stream containing hydrogen sulfide and at least one unselected component, the apparatus comprising:

a first absorber for contacting the sour gas feed stream with a first portion of an absorbent having greater selectivity for hydrogen sulfide than the at least one unselected component, discharging a partially sweetened gas stream and a first hydrogen sulfide rich absorbent solution;

means for introducing the sour gas feed stream into the first absorber;

a second absorber connected to the first absorber for contacting the partially sweetened gas stream with a second portion of the absorbent, discharging a sweetened gas stream and a second hydrogen sulfide rich absorbent solution;

regenerating means, connected to the first and second absorbers, for regenerating the first and second hydrogen sulfide rich absorbent solutions, discharging a hydrogen sulfide rich concentrated acid gas stream that is at least partially employed as a recycle stream, and discharging a regenerated absorbent solution that is employed as the absorbent in the first and second absorbers;

recycling means, connected to the regenerating means, for recycling the recycle stream to the means for introducing the sour gas feed stream into the first absorber; and splitting means, connected between the regenerating means and the recycling means for physically dividing the concentrated acid gas stream into the recycle stream and a portion that is sent to the sulfur recovery unit.

5. The apparatus of claim 4 further comprising a means for mixing the recycle stream with the sour gas stream fed to the first absorber.

6. The apparatus of claim 4 further comprising a means for heat exchange, connected between the first and second absorbers and the regenerating means, for heating the combination of the first and second hydrogen sulfide rich absorbent solutions from the first and second absorbers.

7. Apparatus for processing a sour gas feed stream prior to sending the stream to a sulfur recovery unit, the sour gas feed stream containing hydrogen sulfide and at least one unselected component, the apparatus comprising:

- a first absorber for contacting the sour gas feed stream with a first absorbent having greater selectivity for hydrogen sulfide than the at least one unselected component, discharging a partially sweetened gas stream and a first hydrogen sulfide rich absorbent solution;

- means for introducing the sour gas feed stream into the first absorber;

- first regenerating means, connected to the first absorber, for regenerating the first hydrogen sulfide rich absorbent solution from the first absorber, discharging a hydrogen sulfide rich concentrated acid gas stream that is at least partially employed as a recycle stream, and a regenerated absorbent solution that is employed as the first absorbent in the first absorber;

- recycling means, connected to the first regenerating means, for recycling the recycle stream to the means for introducing the sour gas feed stream into the first absorber;

- splitting means, connected between the first regenerating means and the recycling means, for physically dividing the concentrated acid gas stream into the recycle stream and a portion that is sent to the sulfur recovery unit;

- a second absorber connected to the first absorber for contacting the partially sweetened gas stream with a second absorbent having greater selectivity for hydrogen sulfide than the at least one unselected component, discharging a sweetened gas stream and a second hydrogen sulfide rich absorbent solution; and

- second regenerating means, connected to the second absorber, for regenerating the second hydrogen sulfide rich absorbent solution from the second absorber, discharging an acid gas stream and a regenerated absorbent solution that is employed as the second absorbent in the second absorber.

8. The apparatus of claim 7 further comprising means for mixing the recycle stream with the sour gas stream fed to the first absorber.

9. The apparatus of claim 7 further comprising a means for heat exchange, connected between the first absorber and the first regenerating means, for heating the first hydrogen sulfide rich absorbent solution from the first absorber.

10. The apparatus of claim 7 further comprising a means for directing the acid gas stream to an incinerator.

* * * * *